(12) United States Patent
Nakagawa et al.

(10) Patent No.: US 6,598,367 B2
(45) Date of Patent: Jul. 29, 2003

(54) DEVICE FOR ADJUSTING POSITION FOR CUTTING BAGS AND PACKAGING MACHINE INCORPORATING SAME

(75) Inventors: Yukio Nakagawa, Shiga (JP); Masashi Kondo, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/004,935

(22) Filed: Dec. 3, 2001

(65) Prior Publication Data

US 2003/0074865 A1 Apr. 24, 2003

Related U.S. Application Data

(60) Division of application No. 09/505,020, filed on Feb. 16, 2000, now Pat. No. 6,408,599, which is a division of application No. 09/306,481, filed on May 6, 1999, now Pat. No. 6,088,994, which is a continuation-in-part of application No. 09/233,768, filed on Jan. 20, 1999, now abandoned.

(30) Foreign Application Priority Data

| Jan. 20, 1998 | (JP) | .......................................... 10-022750 |
| May 13, 1998 | (JP) | .......................................... 10-129925 |
| Jan. 5, 1999 | (JP) | .......................................... 11-000730 |

(51) Int. Cl.[7] .............................. B65B 9/20; B65B 57/02

(52) U.S. Cl. .............................................. 53/75; 53/551
(58) Field of Search .......................... 53/75, 551, 552, 53/51

(56) References Cited

U.S. PATENT DOCUMENTS

| 3,921,928 A | * | 11/1975 | Henry ............................ 53/51 |
| 4,023,327 A | * | 5/1977 | Simmons ........................ 53/51 |
| 4,144,693 A | * | 3/1979 | Ogata ............................ 53/51 |
| 4,727,707 A | * | 3/1988 | Hadden ........................ 53/451 |

* cited by examiner

Primary Examiner—John Sipos
(74) Attorney, Agent, or Firm—Beyer Weaver & Thomas LLP

(57) ABSTRACT

A form-fill-seal packaging machine produces a dummy bag from a film by starting to move seal jaws after the film has been pulled over a specified length or for a specified length of time from the moment when an eye mark on the film is detected by a detector. If the position on the film at which it was cut is displaced from the intended position, this displacement is inputted such that the specified length or the specified length of time is automatically corrected. If any of the parameters defining the pattern of transverse sealing operation is changed, the specified length or the specified length of time can also be automatically adjusted.

1 Claim, 8 Drawing Sheets

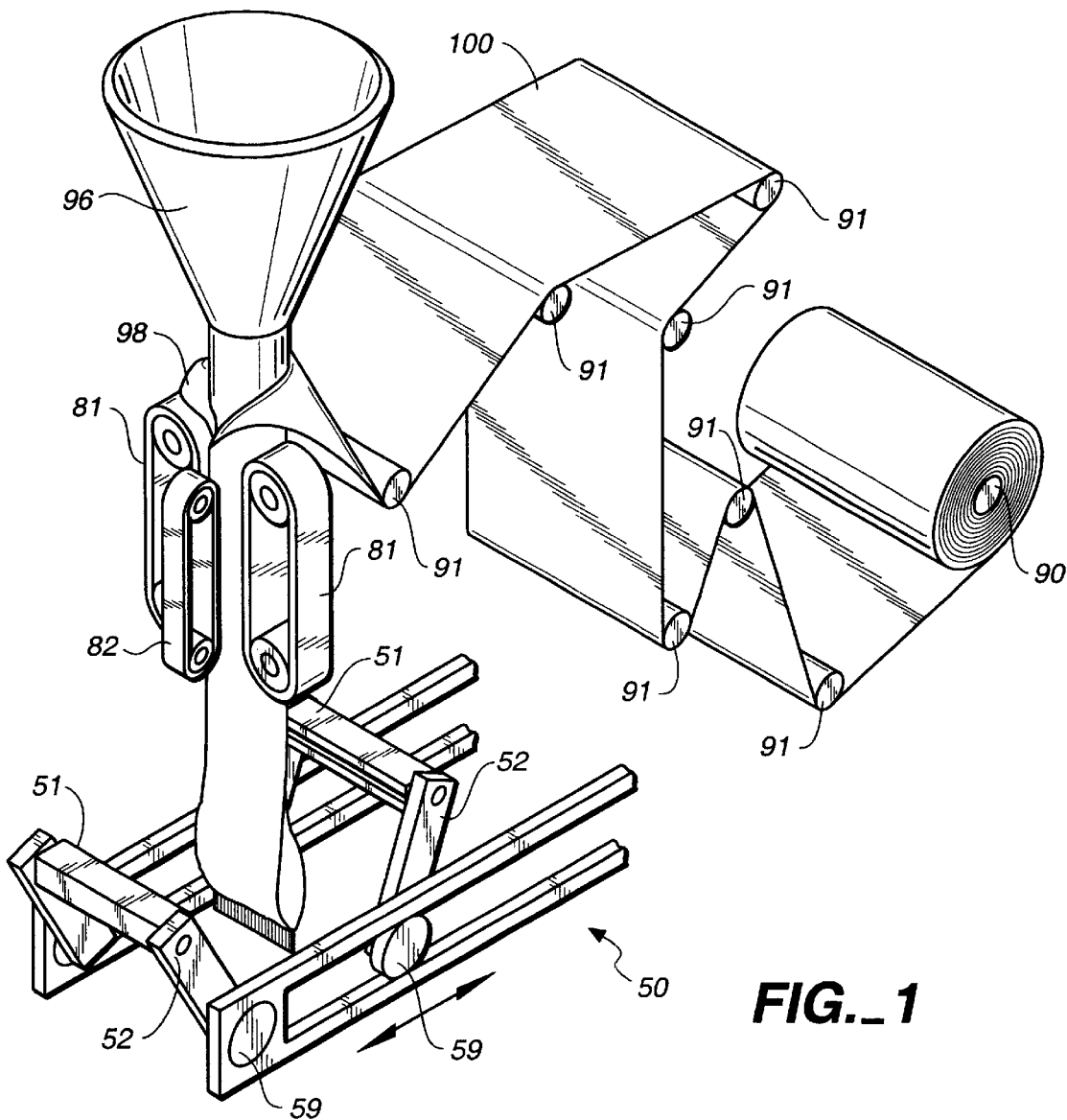
FIG._1

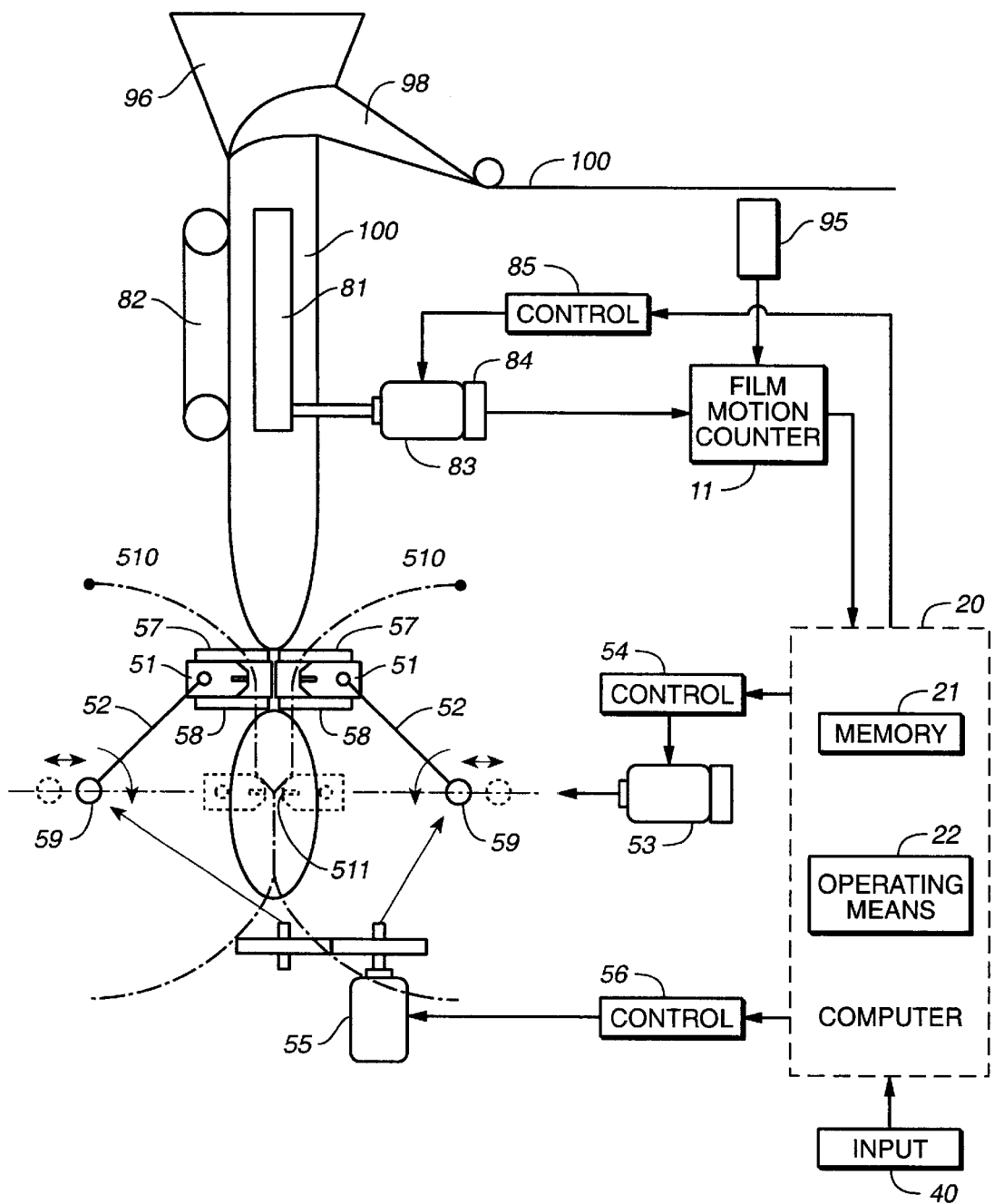
FIG._2

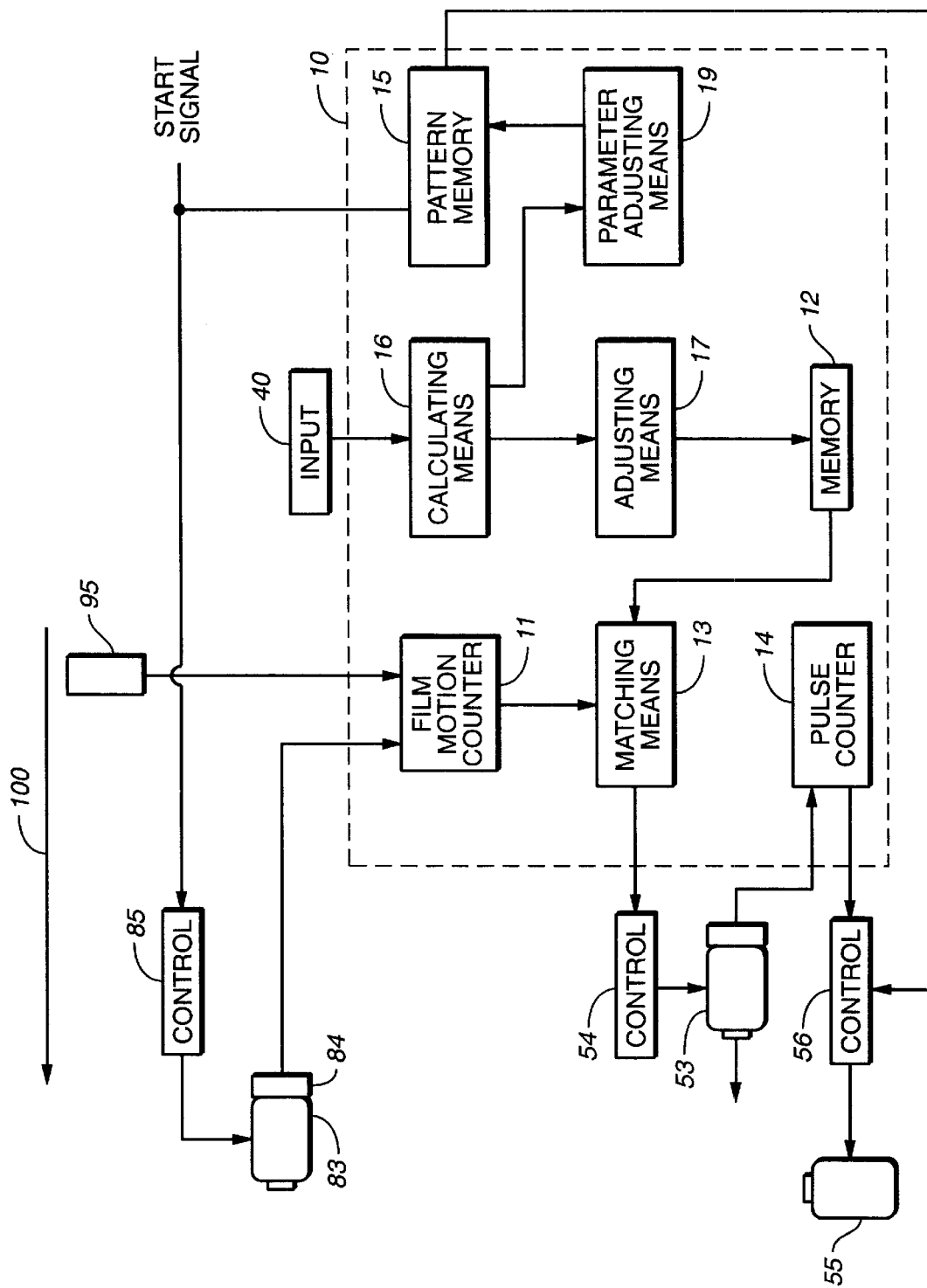
FIG._3

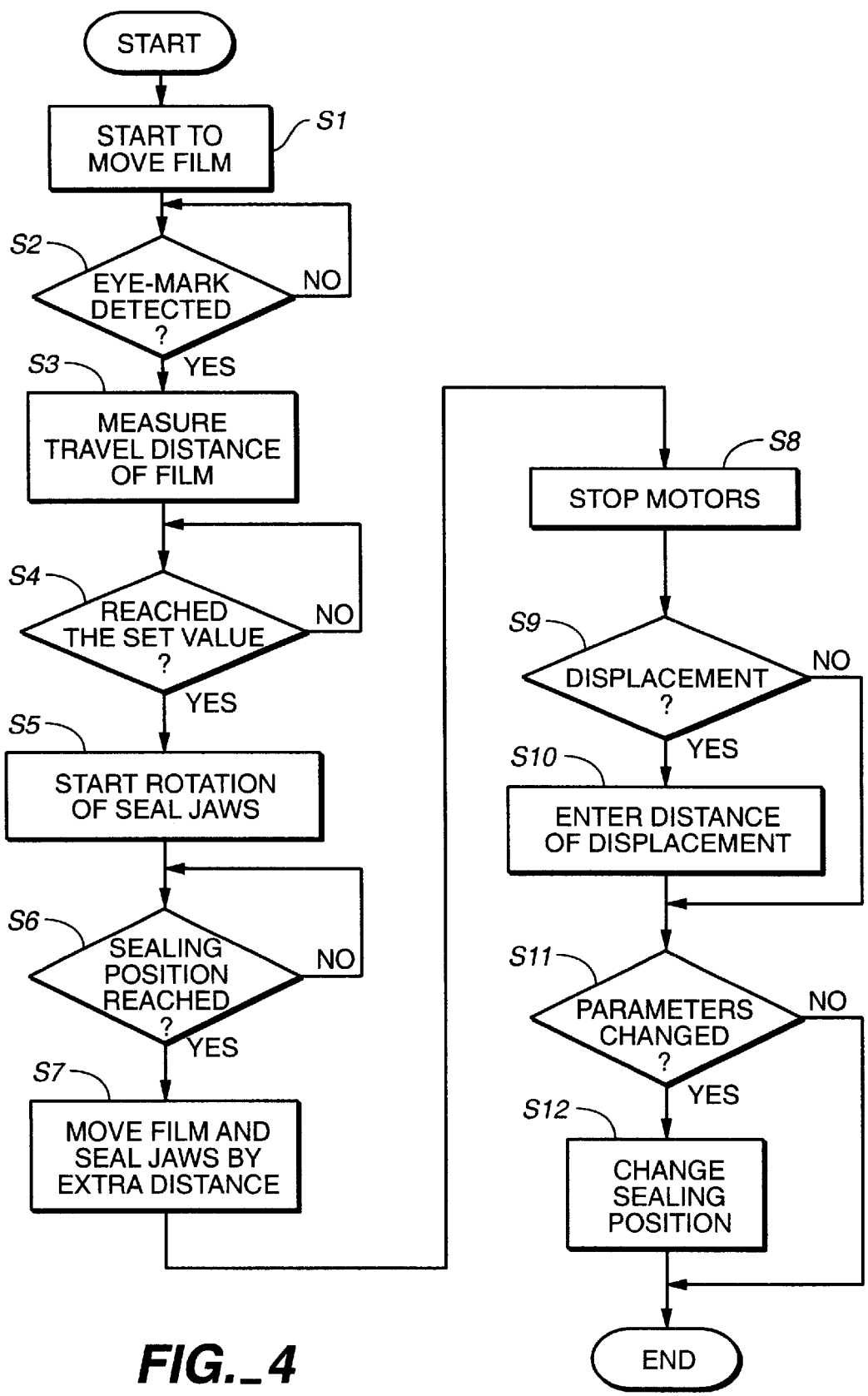
FIG._4

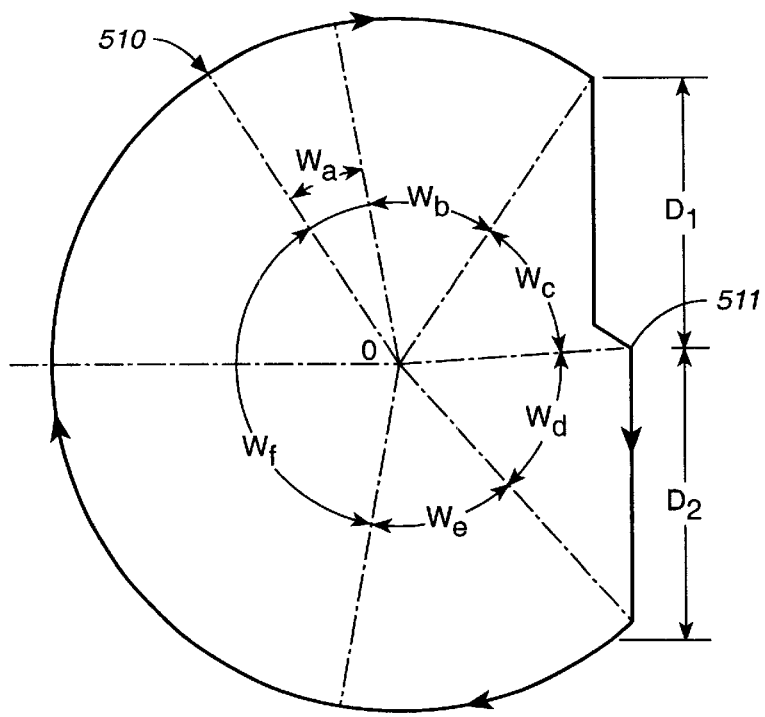
FIG._5
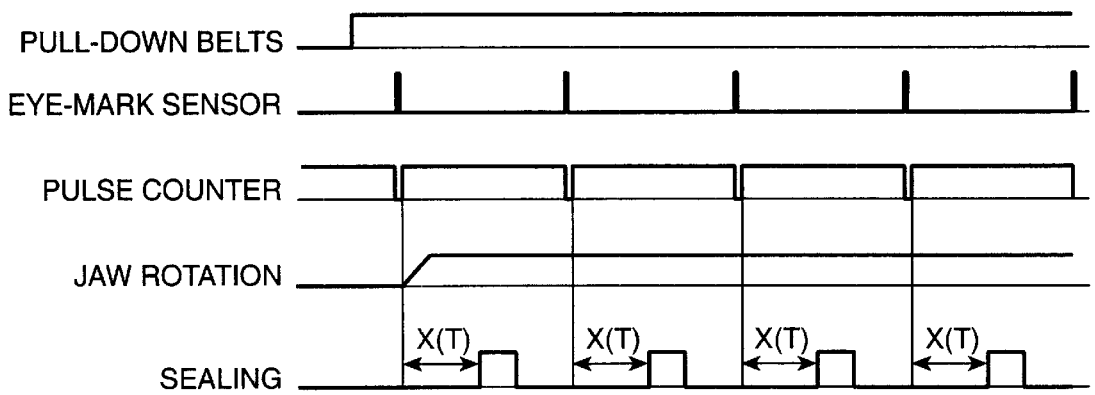
FIG._8

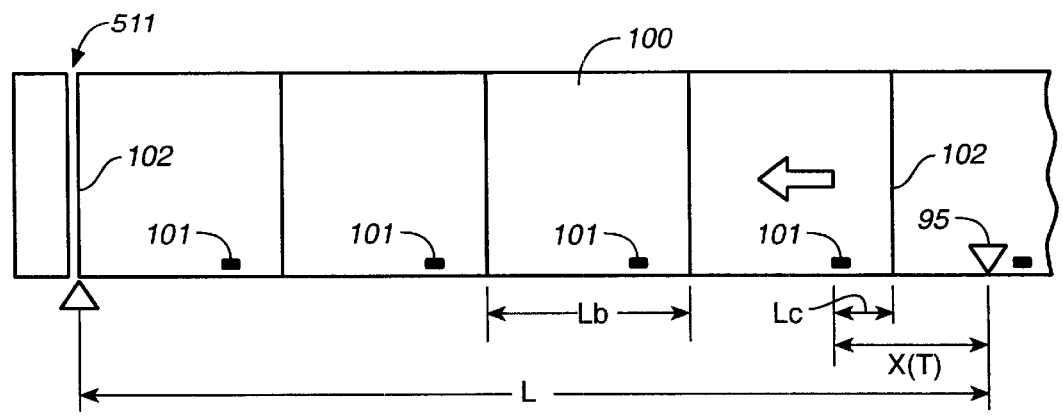
FIG._6
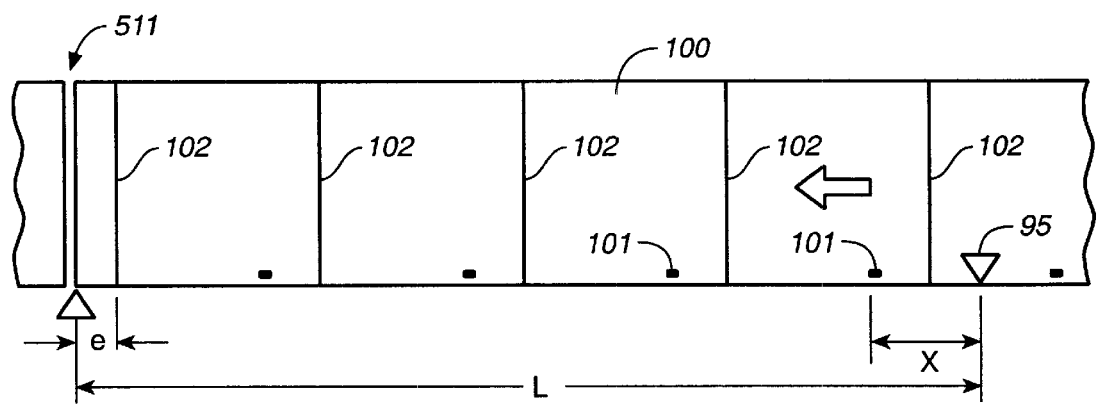
FIG._7

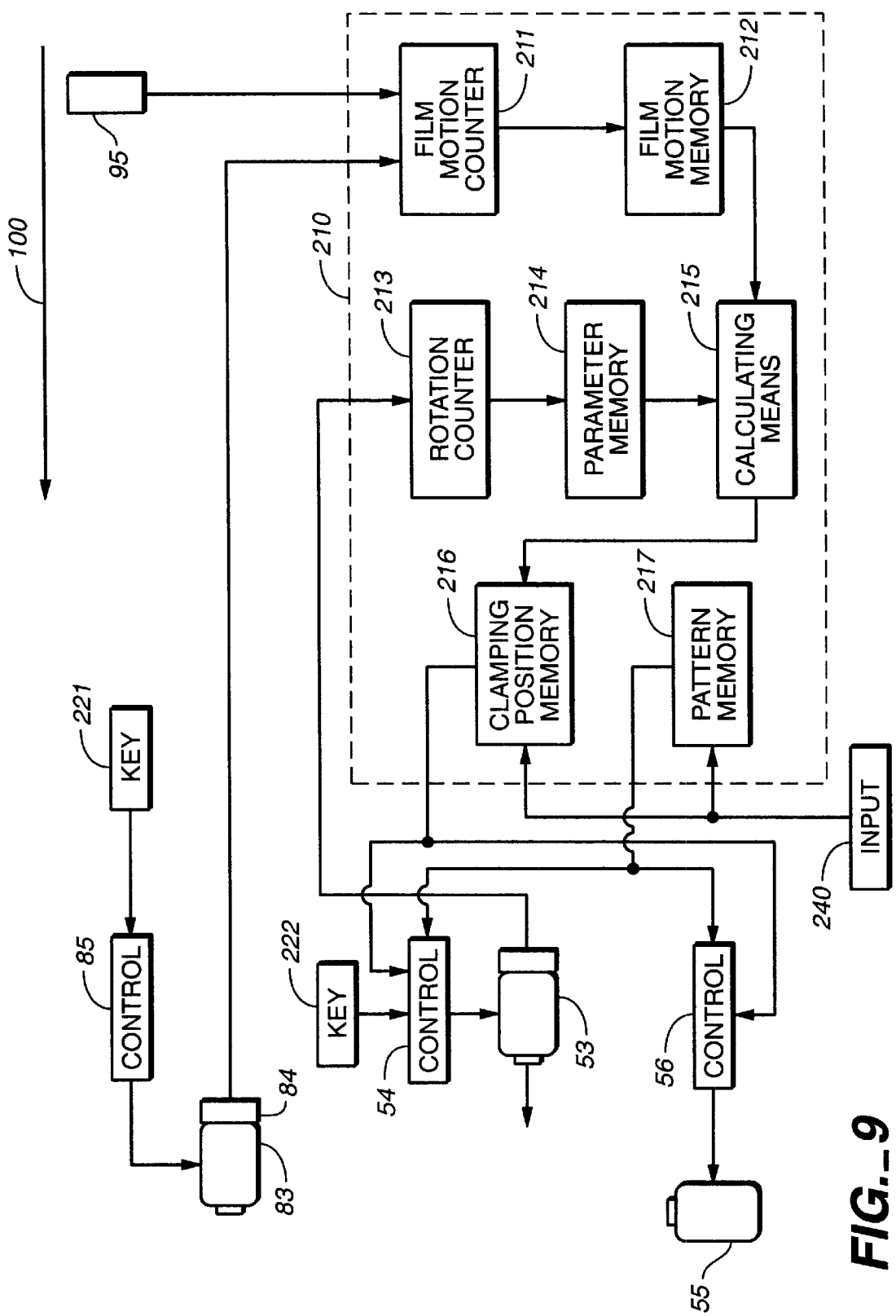
FIG._9

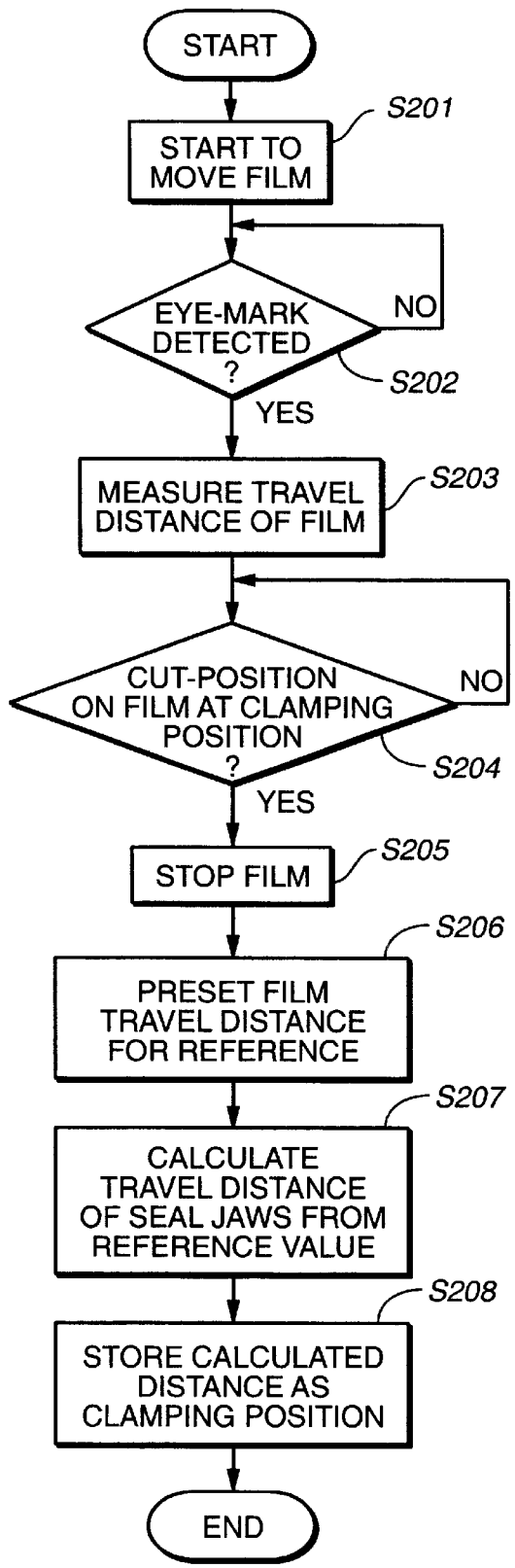
FIG._10A
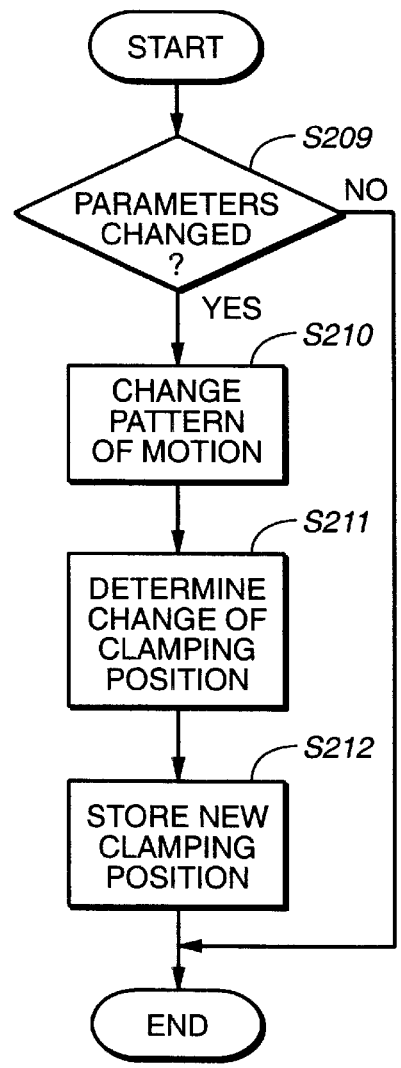
FIG._10B

DEVICE FOR ADJUSTING POSITION FOR CUTTING BAGS AND PACKAGING MACHINE INCORPORATING SAME

This is a divisional of application Ser. No. 09/505,020 filed Feb. 16, 2000 now U.S. Pat. No. 6,403,599 which is now pending and is a divisional of application Ser. No. 09/306,481 filed May 6, 1999 U.S. Pat. No. 6,088,994 which is a continuation-in-part of application Ser. No. 09/233,768 filed Jan. 20, 1999, now abandoned.

BACKGROUND OF THE INVENTION

This invention relates to a packaging machine of the so-called form-fill-seal type adapted to concurrently form a bag from a film, to fill it with articles and to seal it to obtain individual packaged products. More particularly, this invention relates to a device for adjusting the position on the film at which it is cut ("cut-position") to produce separated bags. The invention also relates to a packaging machine adapted to automatically adjust the cut-position according to an inputted size of the bags to be produced.

Packaging machines adapted to concurrently bend a film into a tubular form, to fill it with articles to be packaged and to clamp it between a pair of sealing members ("seal jaws") to simultaneously seal the top part of a filled bag and the bottom of the next bag to be filled have been known. If the bags are formed from a film with a design printed thereon corresponding to each bag to be formed, marks (hereinafter referred to as the "eye marks") which are detectable by a light sensor are printed on the film at longitudinal intervals corresponding to the length of the bags to be made such that the film can be accurately sealed over and cut at boundary areas between portions of the film corresponding to two mutually adjacent bags as the packaging machine is operated to repeat a cyclic motion.

Prior art methods of determining the cut-position of the bags or the clamping position by seal jaws can be roughly divided into those of adjusting the interval between the time when an eye mark on the film as a reference is detected and the time at which the film is cut (such as adjusting the dislocation of the cut-position while changing the time set on a timer by operating a dial) and those of displacing the position of the sensor for the eye marks (that is, to move the eye mark sensor by a distance corresponding to the displacement of the cut-position). The methods of the former kind are not desirable because repeated trials and errors tend to increase the wasted amount of the film. The methods of the latter kind are advantageous in that one has only to displace the eye mark sensor but it is a cumbersome operation to make the position adjustment while watching the markings of a dial.

In the case of packaging machines of a continuously operated type having a linearly moving transverse sealing mechanism, in particular, the cut-position of the film also changes whenever the stripping distance is changed according to the kind of the articles to be packaged or the pattern of motion (such as the time of sealing) for the transverse seal jaws. Thus, the operator had to adjust the cut-position whenever such a change had to be made. This also contributed to increase the waste of the film material.

SUMMARY OF THE INVENTION

It is therefore an object of this invention to provide an improved device for automatically adjusting the cut-position of a bag-making film material in response simply to an input of a displacement of the cut-position obtained from a dummy bag formed for testing.

It is also an object of this invention to provide a packaging machine incorporating such a device or method.

It is another object of this invention to provide a packaging machine capable of cutting the film automatically at intended positions in response only to an input of the bag size or the eye mark position.

It is a further object of this invention to provide a device for a packaging machine for automatically adjusting the cut-position of a bag-making film merely by transporting the film until a cut-position on the film reaches the film-cutting position.

According to a method embodying this invention, the motion of a pair of seal jaws is started after the film has been pulled over a specified length or for a specified length of time (both referred to as "the travel condition") from the moment when an eye mark on the film is detected by a detector to thereby obtain a dummy bag for examining whether the film was cut at a right position. If not, the displacement from the intended cut-position is measured and used to correct the initially specified travel condition. Alternatively, the correction of the initially specified travel condition may be effected on the basis of displacement of the clamping position due to changes in various parameters for determining the pattern of the motion of the seal jaws.

A device embodying this invention may be characterized as comprising a memory for storing the aforementioned travel condition such as the distance by which the film is initially caused to travel between the time when an eye mark on the film is detected and the time when the motion of the seal jaws is to be started, an input means through which the displacement of the position on the film where it is actually cut and the intended cut-position is inputted, and calculating means for adjusting the aforementioned travel condition according to the displacement inputted through the input means.

A packaging machine of this invention may be characterized as comprising film transporting means such as pull-down belts for moving a film along a specified path, a detector for detecting an eye mark on the film, a transverse sealer operating cyclically and having a pair of seal jaws for clamping the film from opposite sides and cutting it to form a bag, a memory for storing certain data such as desired length of the bags to be made, and means for using these data to calculate a distance or time of travel by the film and controlling the motion of the seal jaws and hence the timing of clamping the film thereby.

Since the initial motion of the film (expressed either by the distance or time of its travel) is corrected by preliminarily producing a dummy bag as a test and measuring the displacement of the actually cut position from where the cutting was intended, the film-cutting position can be automatically and easily adjusted without wasting a large amount of film.

According to another method embodying this invention, the distance of travel by the film is measured from the moment when an eye mark is detected until the cut-position fixed on the film reaches the specified clamping position of the seal jaws and the timing of motion for the seal jaws at their initial positions is determined on the basis of this measured distance of travel. Accordingly, an adjusting device employing this method of adjustment may be characterized as comprising means for measuring and storing the distance of travel by the film from the detection of an eye mark until the cut-position reaches the clamping position and means for calculating the timing for starting the motion of seal jaws at their initial positions. With such a method or a device, the film can be cut exactly at the intended cut-position and hence the waste of the film can be reduced to a minimum merely by measuring the distance of travel of the film from the detection of an eye mark until the cut-position reaches the clamping position of the seal jaws.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic diagonal view of a part of a form-fill-seal packaging machine incorporating a device for cutting bags according to this invention;

FIG. 2 is a schematic block diagram of a control system for the packaging machine of FIG. 1;

FIG. 3 is a block diagram of a control circuit which may be used in the control system shown in FIG. 2;

FIG. 4 is a flow chart for the operation of the packaging machine of FIG. 1 with control system shown in FIGS. 2 and 3;

FIG. 5 is a diagram for showing a pattern of the motion of a seal jaw;

FIG. 6 is a plan view of a portion of the film used in this invention;

FIG. 7 is another view of a portion of the film for explaining a method embodying this invention;

FIG. 8 is a time chart for the operation of packaging machine according to a method of this invention;

FIG. 9 is a schematic block diagram of another control circuit which may be used in the control system shown in FIG. 2; and FIGS. 10A and 10B are flow charts for the operation of the packaging machine of FIG. 1 with control system shown in FIGS. 2 and 9.

Some of like or equivalent components in different control circuits may be indicated by the same symbols for convenience and may not be explained repetitively.

DETAILED DESCRIPTION OF THE INVENTION

For the purpose of reference, there is schematically shown in FIG. 1 a form-fill-seal packaging machine of the so-called vertical pillow type which may incorporate the present invention. For convenience, FIG. 1 shows only relevant parts of such a machine related to its forming, filling and sealing operations. U.S. Pat. No. 5,279,098 issued Jan. 18, 1994, for example, may be referenced for a detailed account of general structure and operations of such a machine. FIG. 2 shows schematically a control system including a computer 20 broadly described here only as having a data storing means ("memory" 21) and means for performing various operations ("operating means" 22), which may be used for such a packaging machine. A control system according to one particular embodiment of the invention is described next with reference to FIG. 3 showing its control circuit 10 more in detail. FIGS. 1, 2 and 3 will be referenced next to explain this embodiment of the invention generally.

As shown in FIG. 1, an elongated web of flexible thermoplastic material (herein referred to as "the film") 100 unwinds from a supply roll 90, being pulled by a pair of pull-down belts 81, and is guided by a plurality of guide rolls 91 towards a former 98 which serves to bend the film 100 into a tubular form. The pull-down belts 81 are operated by a belt-driving motor 83. A pulse generator 84 is attached to the drive shaft of this belt-driving motor 83, and the output pulse from this pulse generator 84 is adapted to be received by a film motion counter 11.

After the mutually overlapping side edges of the tubularly formed film 100 is thermally sealed together by a longitudinal sealer 82 as the film 100 is pulled vertically downward along a specified film path, the tubular film 100 is sealed transversely (or horizontally) by a transverse sealer 50 Which is disposed below the pull-down belts 81 and includes a pair of seal jaws 51. The pair of seal jaws 51 of the transverse sealer 50 is disposed on mutually opposite sides of the film path and is adapted to move on generally D-shaped trajectories in mutually opposite directions so as to clamp the film 100 therebetween. Each of the seal jaws 51 is rotatably supported at one end of an elongated member (referred to as "the arm") 52 adapted to rotate around an axis 59 at its other end such that both seal jaws 51 are always oriented in the same direction as they rotate around the axes 59 (for example, by means of a Schmidt coupling as illustrated in aforementioned U.S. Pat. No. 5,279,098).

The arms 52 are rotated by means of a servo motor (referred to as "the arm-rotating motor") 53, and their axes 59 are adapted to be moved horizontally towards each other or away from each other by means of another servo motor (referred to as "the axis-shifting motor") 55. Control units for these servo motors 53 and 55 are indicated by numerals 54 and 56, respectively. The control circuit 10 serves to control the rotary motion of the arms 52 and the distance between their axes of rotation 59 such that the seal jaws 51 undergo a rotary motion of a prescribed pattern on generally D-shaped trajectories in mutually opposite directions.

A shutter plate 57, biased horizontally by a spring, is attached to the upper surface of each seal jaw 51, and a stripping plate 58, similarly biased horizontally by a spring, is attached to the bottom surface of each seal jaw 51. After the tubular film 100 is transversely sealed to form the bottom of a bag, articles to be packaged are dropped from a hopper 96 above the former 98. Both the shutter plates 57 and the stripping plates 58 are adapted to approach the film 100, immediately before the seal jaws 51 engage each other in the next cycle to close the top of the bag, such that the film 100 will be stripped while articles belatedly dropping down from above are prevented from entering the bag being about to be clamped and sealed transversely. Although not shown, a blade is provided on one of the seal jaws 51 for cutting the film 100 horizontally across its sealed area immediately after the seal jaws 51 engage each other, thereby separating the bag which has just been filled as a finished product. The sealed area serves also as the bottom edge of the next bag to be filled with articles.

Next, an example of the method of adjusting the position of cutting the film 100 for separating a finished bag will be outlined. First, the pull-down belts 81 are started such that the film 100 begins to travel along its path, as described above. After one of the eye marks (not shown), provided at equal intervals on the film 100 as reference points, is detected by an eye mark sensor 95, the film 100 is caused by the computer 10 to advance by a provisionally specified distance before the motion of the seal jaws 51 from their provisionally specified initial positions 510 is started. The eye mark sensor 95 may be of a type serving to detect the eye marks by reflection or transmission of light. A detection signal therefrom is inputted to the control circuit 10 and serves as a starting time for synchronizing the motion of the film 100 and the cyclic motion of the seal jaws 51. When the seal jaws 51 are engaged together at their specified clamping position 511 and the film 100 is thereby cut by the blade to produce a dummy bag, the operation of the packaging machine is stopped and the dummy bag thus produced is examined to see whether or not the film 100 was cut at the desired cut-position. If the film 100 was cut at a position not exactly coinciding with the intended cut-position, the displacement, or the distance between these two points, is measured. The provisionally set distance is changed by this distance.

The pattern of the motion (including the shape of the trajectories) of the seal jaws 51 is determined by many action parameters such as the stripping time (during which stripping is carried out prior to the closing of a bag) and the sealing time (during which a filled bag is transversely sealed). If the user wishes to change any of these action parameters, the position at which the seal jaws 51 come to engage each other, for example, can be easily determined by a calculation from known relationships. Thus, the cut-position can be adjusted also by varying the aforementioned provisionally specified distance.

As shown schematically in FIG. 3, the distance traveled by the film 100 is calculated by the film motion counter 11 from the number of rotations of the belt-driving motor 83, or the pulses from the pulse generator 84 as described above, and is received therefrom by a matching means 13 to be described below. A distance, which is intended to be traveled by the film 100 from the moment when the eye mark sensor 95 detects one of the eye marks on the film 100 until the motion of the seal jaws 51 from their initial positions 510, is inputted initially as an initial condition (in terms of number of pulses) through an input means 40 and is stored in a memory 12. The aforementioned matching means 13 is for outputting a start signal to the control unit 54 for the arm-rotating motor 53 to start the rotary motion of the seal jaws 51 from their initial positions 510 when the counted pulse number transmitted from the film motion counter 11 matches the pulse number inputted through the input means 40 and stored in the memory 12, as explained above. The angle of rotation by the arms 52 around the axes 59 as the seal jaws 51 move from their initial positions 510 to the clamping position 511 is measured by a pulse counter 14 by the rotation of the arm-rotating motor 53. The aforementioned distance of displacement obtained by measuring on the test bag is inputted by the user also through the input means 40, is converted into a corresponding pulse number by a calculating means 16, and is outputted to an adjusting means 17 for adjusting the initially set distance value stored in the memory 12 by adding or subtracting this distance of displacement.

The input means 40 may be used also to input various action parameters for the operation of the packaging machine as described above. The input means 40 may comprise a touch screen, adapted to selectably display different images for specifying the size of the bags to be produced and the kind of articles to be packaged. It may be adapted to allow the number N of cycles of operation (or the number of bags to be produced per unit time), the stripping distance, the length $L_b$ of the bags to be produced and the distance $L_C$ between an eye mark and a position for cutting the film 100 to be inputted corresponding to the kind of bags to be produced.

The angular velocity of the seal jaws 51 and their angular positions when they engage each other, calculated by the calculating means 16, are received by a parameter adjusting means 19 which serves to correct the corresponding data already stored in a pattern memory 15 by adding or subtracting corresponding correction values. A control signal is outputted from this pattern memory to the control unit 85 for the belt-driving motor 83 and also to the control unit 56 of the axis-shifting motor 55 to move the axes 59 of rotation of the arms 52 horizontally such that the seal jaws 51 will travel on trajectories of a-desired shape as indicated in part by broken lines in FIG. 2.

FIGS. 4 and 5 are referenced next to explain the operations for the adjustment of the film-cutting position more in detail. The adjustment is started by starting the belt-driving motor 83 while the seal jaws 51 are stopped at their initial positions 510 and the film 100 begins to move along its path (Step S1). When the eye mark sensor 95 detects an eye mark on the film 100 (YES in Step S2), a detection signal is transmitted to the film motion counter 11 to start measuring the distance of travel by the film 100 thereafter by the number of pulses (Step 3).

A distance value by which the film 100 is to move during the wait time period from the moment when an eye mark on the film 100 is detected by the eye mark sensor 95 until the seal jaws 51 are to begin their rotary motion is initially stored in the memory 12 as a number of pulses and this pulse number is inputted to the matching means 13. When the pulse number representing the actual distance of travel of the film 100 received from the film motion counter 11 reaches the pulse number stored in the memory 12 (YES in Step 4), the matching means 13 outputs a match signal, and the control unit 54 for the arm-rotating motor 53, in response to this match signal, causes the seal jaws 51 to start their rotary motion from their initial positions 510 (Step S5). The angle of their rotary motion is monitored similarly by the number of pulses by the pulse counter 14.

The trajectory of each seal jaw 51 is determined according to action parameters stored in the pattern memory 15. As shown in FIG. 5, the seal jaw trajectory may be divided into an accelerating part $W_a$ where the seal jaw 51 accelerates from the initial position 510, a preparatory part $W_b$ where the seal jaw 51 is accelerated or decelerated to be prepared for the following stripping action, a stripping part $W_c$ where the stripping takes place and the seal jaw 51 moves on a straight line at a constant speed twice as fast as the film speed at which the film 100 is caused to travel downward, a sealing part $W_d$ where the film 100 remains clamped while being transversely sealed and the seal jaws travel at the same speed as the film 100, a transition part $W_e$ where the seal jaw 51 is accelerated or decelerated to change its speed and a return part $W_f$ where the seal jaw 51 returns to the initial position 510 at a constant speed. It now goes without saying that the aforementioned clamping position 511 at which the pair of seal jaws 51 comes to be engaged with each other will shift if the distance $D_1$ for effecting stripping and/or the time for sealing (while the seal jaws 51 move a distance indicated by $D_2$ in FIG. 5) is changed.

When the seal jaws 51 reach the sealing position 511 (YES in Step S6) at the end of the stripping part $W_c$, the film 100 is transversely sealed while it travels on the sealing part $W_d$ of the trajectory.

The motion of the seal jaws 51 as described above is effected according to the action parameter stored in the pattern memory 15 as described above. After a dummy bag is thus formed, the motors 83, 53 and 55 are stopped (Step S8) after a specified overrun period during which the film 100 and the seal jaws 51 are allowed to move a certain extra distance before stopping (Step S7). The dummy bag thus formed is removed from the machine and examined to check if the film 100 was cut at the right cut-position (Step S9).

If the user decides that there is a displacement requiring a correction (YES in Step S9), the distance by which the correction is to be made is inputted through the input means 40 to the calculating means 16 to be converted into units of pulses and is added to or subtracted from the provisionally set distance (in units of pulses) traveled by the film 100 between the times when the eye mark is detected and when the motion of the seal jaws 51 is started (Step S10).

If the stripping distance $D_1$ is changed, depending on the kind of the articles to be packaged, or if the sealing time is changed, depending on the kind of the film 100 being used or the speed of packaging, such that the action parameters of the operation are changed (YES in Step S11), the angular velocity of the seal jaws 51 between the initial position 510 and the clamping position 511, as well as the clamping position 511 itself will change. Thus, the action parameters of the arm-rotating motor 53 and the axis-shifting motor 55 are appropriately changed accordingly (Step S12).

Next, FIG. 2 is referenced to describe another aspect of the invention wherein the input means 40 is used to input not only the number N of cycles of operation, the stripping distance, the length $L_b$ of each bag and the distance $L_C$ between an eye mark and a position for cutting the film 100 for each of various kinds of articles to be packaged, but also parameters common to all kinds of bags to be produced, such as the distance L between where an eye mark is detected by the sensor 95 and the clamping position 511 of the seal jaws 51. Although the distance L can theoretically be calculated by the operating means 22 of the computer 20 from the design specifications of the packaging machine, there are always some deviations from the specification and, when a film is actually loaded and the machine is operated, there may be detected a finite displacement. If this displacement is measured and the distance L is corrected by using this measured displacement value, a more precise operation of the machine becomes possible. The method for this correction is described below.

Examples of data stored in the memory 21 of the computer 20 include N, $L_b$ and $L_C$, as defined above, for each kind of articles to be packaged. The distance L between where an eye mark is detected and where the film is clamped (the clamping position 511) is also stored. If the user specifies a kind of articles to be packaged through the input means 40, the corresponding data N, $L_b$ and $L_C$ are retrieved from the memory 21 and may be displayed on a screen (not shown) which may be a part of the input means 40.

On the basis of these retrieved data, the operating means 22 calculates various control parameters for the seal jaws 51 and the pull-down belts 81, transmitting them to the control units 54, 56 and 85 therefor. Examples of these control parameters include the initial position 510 of the seal jaws 51, their angular velocities in various parts $W_a$–$W_f$ of their trajectory as they undergo a cyclic motion and the distance between the axes 59 in each of these trajectory parts $W_a$–$W_f$. These parameters are calculated according to the selected bag size and the speed of operation.

The initial position 510 is determined such that the seal jaw 51 starting to move therefrom and the cut-position on the film 100 being transported will come together at the clamping position 511 at the same time. Let T denote the time required for the seal jaw 51 to reach the clamping position after starting to move from the initial position 510 when an eye mark is detected. Since this is also the time during which a cut-position on the film 100 must reach the clamping position 511, the following condition must be satisfied $$X = TV = L - nL_b + L_C$$

(as shown in FIG. 6 wherein eye marks and cut-positions on the film 100 are indicated by numerals 101 and 102, respectively) where L is as defined above, X is the distance traveled by the film 100 in this time interval T, V is the constant speed at which the film 100 is pulled by the pull-down belts 81, and n is an integer representing the number of bags to be made from the portion of the film 100 of length L. The initial positions 510 of the seal jaws 51 are thus determined.

If the value of L in the above equation is not known accurately, it can be ascertained as follows. First, the seal jaws 51 are started from provisionally selected starting positions when an eye mark on the film 100 is detected. Let t and x respectively denote the time required for the seal jaws 51 to reach the clamping position 511 and the distance traveled by the film 100 in the meantime. After the film 100 has traveled the distance x, it is clamped, sealed and cut to produce a test bag, as shown in FIG. 7. If the position at which the film was cut is displaced from the intended cut-position, this displacement e is measured and inputted through the input means 40. Corrections on t and x are made according to the following equations by the operating means 22:

$$T = t \pm e/V,$$
$$X = x \pm e.$$

The value of L is obtained therefrom as follows:

$$L = X - L_C 30 \, nL_b$$

and these corrected values are stored in the memory 21.

The operations described above will be explained next with reference to the timing chart of FIG. 8. When the user specifies a kind of articles to be packaged through the input means 40, the corresponding bag size and conditions for the operation of the packaging machine are retrieved from the memory 21, displayed on a screen of the input means 40 and transmitted to the operating means 22. The operating means 22 use these data to calculate various parameters for the operation of the packaging machine, including the determination of the initial positions 510 for the seal jaws 51.

After this preliminary preparation is completed, the user presses a start button (not shown) and causes the computer 20 to transmit start signals to the control units 85, 54 and 56. The pull-down belts 81 begin to rotate and the film 100 is advanced along its path. The distance traveled by the film 100 is monitored by the film motion counter 11. As soon as an eye mark 101 is detected by the eye mark sensor 95, a detection signal is outputted therefrom and the film motion counter 11 is thereby reset, starting its counting of pulses from the pulse generator 84. At the same time, the seal jaws 51 begin their rotary motion and reach the clamping position 511 after time T. In the meantime, a cut-position 102 on the film 100 also reaches the clamping position 511, meeting the seal jaws 51 at the same time, and the film 100 is cut there to form a bag.

This cycle of operations is repeated every time one of the eye marks 101 is detected by the eye mark sensor 95.

The invention was described above more or less in general terms with reference to only a limited number of embodiments. A few specific examples of packaging machines will be described next for better understanding of the invention.

A first example of packaging machine according to this invention may be characterized as being adapted to cause the seal jaws 51 to clamp the film 100 after the film 100 is caused to travel a specified distance from the moment an eye mark is detected, and the memory 21 stores $L_b$, $L_C$ and L such that the timing for the clamping by the seal jaws 51 is controlled according to the aforementioned specified distance.

A second example of packaging machine may be characterized as being adapted to cause the seal jaws 51 to clamp the film 100 after the film 100 is caused to travel for a specified length of time from the moment an eye mark is detected, and the memory 21 stores not only $L_b$, $L_C$ and L but also the number N of bags to be produced per unit time. The speed of the film 100 is obtained as $NL_b$ such that the timing for the clamping by the seal jaws 51 is controlled according to the aforementioned specified length of time.

A third example of packaging machine may be characterized as being adapted to cause the seal jaws 51 to clamp the film after the film 100 is caused to travel under a specified condition ("travel condition") such as only over a specified distance or for a specified length of time, and the memory 21 stores for each of various kinds of articles to be packages corresponding values of N, $L_b$ and $L_C$, as well as L in common for all kinds of articles. The input means 40 allows the user to specify one of these kinds, and data corresponding to the specified kind of articles are similarly retrieved from the memory 21. The operating means 22 uses these data to calculate the aforementioned travel condition, controlling the timing for the clamping by the seal jaws 51 according to this travel condition.

Any of these examples can be further adapted such that the value of L defined above can be accurately determined even where its value is initially not accurately known, as explained above. They can also be further adapted to adjust the control mode of operation according to a specified mode of stripping or sealing time.

FIG. 9 shows another control circuit 210 which may be used in the control system shown in FIG. 2 for a packaging machine embodying this invention adapted to automatically adjust the position for cutting the film 100 merely by transporting the film until the cut-position defined on the film reaches a specified spatial position representing the clamping position, that is, by activating the pull-down belts 81, detecting one of the eye marks 101 while causing the film 100 to advance, measuring the distance traveled by the film 100 from that point in time until a cut-position on the film reaches a specified position and setting the clamping position 511 of the seal jaws 51 on the basis of this measured distance of travel.

Explained more in detail, the control circuit 210 includes a film motion counter 211, a film motion memory 212, a rotation counter 213, a parameter memory 214, a calculating means 215, a clamping position memory 216, and a pattern memory 217 and is provided with an input device 240, as shown in FIG. 9. The film motion counter 211, like the film motion counter 11 shown in and explained with reference to FIG. 3 above, serves to measure the distance of travel of the film 100 pulled by the pull-down belts 81 in terms of the number of rotation of the belt-driving motor 83. The film motion memory 212 is for storing the number of pulse representing the distance traveled by the film 100 from when one of the eye marks is detected by the eye mark sensor 95 until a cut-position marked on the film 100 reaches a specified position such as the clamping position 511 shown in FIG. 2 where the film 100 traverses the straight line connecting the axes of rotation of the two arms 52 for the seal jaws 51. The rotation counter 213 is for measuring the angle of rotation of the seal jaws 51 from their initial positions 510 until they reach the clamping position 511 as the number of rotations of the arm-rotating motor 53. The parameter memory 214 is for storing the number of pulses representing the angle of rotation of the seal jaws 51 from their initial positions 510 to the clamping position 511 for each pattern of motion. The calculating means 215 is for calculating the time at which the seal jaws 51 pass their initial positions 510 on the basis of the number of pulses stored in the film motion memory 212. The clamping position memory 216 is for storing the calculated pulse number as representing the clamping position for the seal jaws 51. The pattern memory 217 is for controlling the arm-rotating motor 53 and the axis-shifting motor 55 according to each of different patterns of motion. The input device 240 allows the user to specify a pattern of motion and transmits a pattern signal to the pattern memory 217 accordingly so as to control the operations of the arm-rotating motor 53 and the axis-shifting motor 55 through their control units 54 and 56. In FIG. 9, numerals 221 and 222 indicate input keys for starting and stopping the belt-driving motor 83 and the arm-rotating motor 53, respectively.

Next, the operation of the control circuit 210 thus structured will be described with reference to FIGS. 5 and 10A and 10B. After the belt-driving motor 83 is started by means of the corresponding input key 221 to cause the pull-down belt 81 to advance the film 100 (Step S201) and when one of the eye marks 101 is detected by the eye mark detector 95 (YES in Step S202), its detection signal activates the film motion counter 211 and the distance of travel by the film 100 from this point in time is measured in terms of the number of pulses (Step S203). This measured value is reset and the counting is re-started every time a new eye mark is detected, that is, every time a portion of the film 100 corresponding to one bag has been advanced.

Next, when a cut-position defined on the film 100 has passed a specified spatial position such as the straight line connecting the axes of rotations 59 of the two arms 52, that is, when the film 100, moving according to a certain pattern of motion, has passed the clamping position 511 (YES in Step S204), the input key 221 is operated to stop the motion of the film 100 such that the cut-position on the film will be at this clamping position 511 (Step S205). At the same time, the pulse number representing the distance by which the film 100 has traveled thus far is preset in the film motion memory 212 (Step S206) as a reference number. This may be done through an input means which is not shown in FIG. 9. Thus, the distance between the eye mark and the cut-position for each bag is stored.

The angular distance traveled by the seal jaws 51 from their initial positions 510 until they reach the clamping position 511 is preliminarily known from the set rate of packaging (or the number of bags to be produced per unit time) and the initial positions 510. This value is stored in the parameter memory 214.

Next, the calculating means 215 calculates, on the basis of the reference pulse number inputted as representing the distance traveled by the film 100, the angle by which the seal jaws 51 have rotated from when the eye mark was detected until they reach the clamping position 511, determining therefrom the timing of the seal jaws 51 for starting to move from their initial positions 510 (Step S207). If the number of pulses corresponding to the distance from one eye mark to the next is 1000 and that corresponding to the distance between one eye mark to the next cut-position is 500, this means that the seal jaws 51 must be about a half rotation before reaching the clamping position 511 when the eye mark is detected because the seal jaws 51 must make a complete rotation while the film 100 travels a distance corresponding to 1000 pulses. On the other hand, the angle of rotation (as well as the time interval) from when the seal jaws 51 leave their initial positions 510 until they reach the clamping position 511 is stored in the parameter memory 214. If the number of pulses corresponding to this angle (or the time interval) is 300, for example, the seal jaws 51 should be started from their initial positions 510 after the time corresponding to (500−300=) 200 pulses has elapsed such that they will reach the clamping position 511 after a time interval corresponding to 300 pulses and the cut-position on the film 100 will also reach the clamping position 511 at the same time.

The timing for starting the motion of the seal jaws 51 is thus determined and stored in the clamping position memory 216 (Step S208). If the motion of the seal jaws 51 is thus started according to this timing after the eye mark is detected, they match exactly with the cut-position on the film 100 at the clamping position 511.

If the packaging speed is changed, if the stripping distance is adjusted according to the kind of articles to be packaged, or if the sealing time is altered according, say, to the kind of film being used, that is, if control parameters of the operations are changed, the patterns of motion of the arm-rotating and axis-shifting motors 53 and 55 must also be changed because not only the angular speed of the seal jaws 51 between the initial positions 510 and the clamping position 511 but also the clamping position 511 itself will change.

To understand this situation more clearly, FIG. 5 may be referenced once again. As shown in FIG. 5 and explained above with reference thereto, the seal jaw trajectory is generally divided into an accelerating part $W_a$, a preparatory part $W_b$, a stripping part $W_c$, a sealing part $W_d$, a transition part $W_e$ and a return part $W_f$. As explained above with reference to FIGS. 3 and 4, the clamping position 511 will shift if the stripping distance (indicated above by symbol $D_1$) and/or the sealing time is changed, and the contents of the parameter memory 214 change accordingly.

Thus, if a change in the packaging speed or other conditions of operation such as the stripping distance or the sealing time is specified through the input device 240 (YES in Step S209 of FIG. 10B), the pattern memory 217 responds by outputting pulse signals indicative of a new angular speed of the seal jaws 51 and a new clamping position, controlling the rotary motions of the arm-rotating and axis-shifting motors 53 and 55 accordingly (Step S210). Thereafter, the angular distance and the timing between the initial positions 510 and the clamping position 511 for the seal jaws 51 are calculated (Step S211) and stored (Step 212). The timing for the starting of motion from the initial positions 510 is likewise calculated, as explained above, from the distance traveled by the film 100, and this is stored in the clamping position memory 216 such that the film 100 can be cut exactly at the desired cut-position.

In summary, many modifications and variations are possible on the described embodiments and examples. Such modifications and variations that are apparent to a person skilled in the art are intended to be within the scope of this invention.

What is claimed is:

1. A cut-position adjusting device for a packaging machine, said packaging machine comprising means for causing an elongated film having detectable eye marks thereon to travel on a path, a pair of seal jaws for moving cyclically to clamp and cut the film transversely to form a separated bag and a detector for detecting the eye marks, said device comprising;

a memory for storing a condition for causing said seal jaws to start moving after one of said eye marks is detected by said detector as said film travels on said path;

input means for allowing a user to input a displacement value according to which said condition is to be changed, said displacement value representing a measured distance between a test cut position at which a dummy bag is cut by said packaging machine in a test and a desired cut position at which said dummy bag was aimed to be cut; and control means for adjusting said condition according to said displacement value inputted through said input means so as to eliminate said displacement value.

* * * * *